US006936318B2

(12) United States Patent
Dent

(10) Patent No.: US 6,936,318 B2
(45) Date of Patent: Aug. 30, 2005

(54) NO TEAR PHARMACEUTICAL POUCH

(75) Inventor: Patrick H. Dent, Sandston, VA (US)

(73) Assignee: Reynolds Metals Company, Richmond, VA (US)

(*) Notice: Subject to any disclaimer, the term of this patent is extended or adjusted under 35 U.S.C. 154(b) by 0 days.

(21) Appl. No.: 10/666,190

(22) Filed: Sep. 17, 2003

(65) Prior Publication Data

US 2005/0058788 A1 Mar. 17, 2005

(51) Int. Cl.[7] .................................................. B65D 1/00
(52) U.S. Cl. ..................... 428/35.7; 428/35.9; 428/349; 428/515; 428/516
(58) Field of Search ............................. 428/35.7, 35.9, 428/349, 515, 516, 347, 461

(56) References Cited

U.S. PATENT DOCUMENTS

| | | | | |
|---|---|---|---|---|
| 5,981,047 A | * | 11/1999 | Wilkie | 428/215 |
| 6,199,698 B1 | | 3/2001 | Hetrick et al. | 206/532 |
| 6,440,508 B1 | | 8/2002 | Tokita et al. | 428/35.2 |
| 6,471,401 B1 | | 10/2002 | Tokita | 383/1 |
| 6,841,211 B1 | * | 1/2005 | Knoll et al. | 428/34.5 |

FOREIGN PATENT DOCUMENTS

| | | | |
|---|---|---|---|
| JP | 6-263135 | 9/1994 | B65D/1/28 |
| JP | 10-156997 | 6/1998 | B32B/9/00 |

* cited by examiner

*Primary Examiner*—Sandra Nolan Rayford
(74) *Attorney, Agent, or Firm*—Tracey D. Beiriger; Eckert Seamans Cherin & Mellott, LLC

(57) ABSTRACT

A multi-layered pouch capable of holding pharmaceutical related items. The pouch includes first and second sides engaged along a plurality of extending and interconnected edges thereof and in order to define a hermetically sealed interior for holding the items. Each of the sides exhibits a multi-layered construction including an outer high density polymer film, coated with a clay material, a lower density polymer film secured to an exposed side of the high density polymer film, a metal foil layer secured to an exposed inner facing side of the lower density film, and a sealant resin layer secured to an exposed facing side of the foil layer. In use, the pouch exhibits tear resistant properties and such as which prevents a child from biting into and opening the pouch.

16 Claims, 2 Drawing Sheets

NO TEAR PHARMACEUTICAL POUCH

FIELD OF THE INVENTION

The present invention relates generally to plasticized pouches and bags, particularly for use in pharmaceutical applications by which the pouch is intended to hold pills, pill containers and the like. More specifically, the present invention discloses an improved tear-resistant pharmaceutical pouch and by which in particular the pouch is constructed of a clay-coated, oriented high density polyethylene film in place of nylon or polyester materials included in prior art pouches.

BACKGROUND OF THE INVENTION

Typical pharmaceutical pouches known in the prior art constructed of nylon, including further a foil adhered layer, and further including a sealant resin or polyester material layer. The adhesion methods employed include the application of dry bond adhesives and various extruded polymers, such as polyethylene, EAA or Surlyn® materials. The conventional child-resistant pouch structure particularly includes, in succession from top to bottom, a 92 gauge polyester film or 100 gauge nylon film, an adhering low density polyethylene/acid copolymer extrusion laminating resin, a 35 gauge aluminum foil, and a polyethylene/acid copolymer or ionomer extrusion sealant resin.

The purpose behind employing the polyester film is to deter or prevent children from tearing or biting their way into the pouch. It has however been found that pouches constructed from these materials often fail more stringent child resistant protocols as outlined by the Consumer Product Safety Commission, this resulting from such as children biting and tearing into the pouch.

Additional examples drawn from the prior art include U.S. Pat. No. 6,199,698, issued to Hetrick et al., and which teaches a pouch for pharmaceutical, cosmetic, medical or similar products. The pouch includes a structure having a top laminate and a bottom laminate, with a pouch enclosure for the product formed in one portion of the structure. The top and bottom laminates are pouch enclosure portions are strongly adhered together in the periphery around the pouch enclosure.

A flap portion is formed by the remainder of the structure with a portion of the involved region of the top laminate and a portion of the involved region of the bottom laminate weakly adhered together and easily pulled apart. Arrangements for separating the flap portion and the pouch enclosure are situated at the interface established therebetween. A notch or slot is located in the strongly adhered periphery of the pouch enclosure portion adjacent to the flap portion. The flap portion is further sized larger than the pouch enclosure portion and both sides of the top laminate and bottom laminate are capable of being printed on.

U.S. Pat. Nos. 6,471,401 and 6,440,508, both issued to Tokita, teach a laminated film including an outer-layer film, a water soluble film, and an intermediate layer interposed between the outer-layer film and the water-soluble film. The intermediate layer contains high-pressure polyethylene oxidized to a prescribed degree on a surface thereof and contiguous to the water-soluble film. The outer-layer film and the intermediate layer adhere fast to each other and intermediate layer in turn directly contacts the water-soluble film in a weak and peel-able manner.

SUMMARY OF THE INVENTION

The present invention teaches a tear-resistant pharmaceutical pouch which is an improvement over prior art pharmaceutical pouches. In particular, the pouch in the present invention incorporates the use of a high-density polyethylene in a pharmaceutical packaging application, combined with the clay coating of the oriented high-density polyethylene, which provides heat resistance along with both the appearance and printability of paper.

The no-tear pharmaceutical pouch structure includes, in a preferred embodiment, first and second planar extending and interconnected sides, each having a 200–300 gauge clay coated oriented high density polyethylene film, forming an outer-most layer, and against which is secured a low density polyethylene or polyethylene/acid copolymer extrusion laminating resin. Additional layers include a 35 gauge aluminum foil secured to an inner side (or surface) of the laminating resin and an innermost layer of a polyethylene/acid copolymer or ionomer extrusion sealant resin.

Without the heat resistance imparted by the clay coating, the outermost layer of oriented high-density polyethylene would melt under normal sealing conditions, causing the molecular orientation to relax, and thereby further negating the tear resistance of the film. The pouch structures are further heat sealed to enclose one or more dosages of pharmaceutical items including, but not limited to, solid oral dosages, effervescent tablets, or transdermal patches, and are only opened through the subsequent cutting (scissoring) of the enclosed package along directional lines indicated thereupon. In this fashion, the mode of failure through children biting and tearing into the pouches is eliminated.

The manufacture of the multi-layered material includes it first being provided upon a web roll which, after being unreeled, is tensioned and then folded in half in a cross sectional direction, via its travel through a plow assembly. Subsequent steps include sealing a bottom edge of the folded material in addition to sealing extending side portions, according to specified width dimensions and at spaced apart increments.

A succeeding blade cutoff step carefully sections the roll, along a substantial mid-point of each sealed side portion, and by which the roll is sectioned into individual pouches. Further succeeding steps include forming an open top edge of each sectioned pouch, utilizing an appropriate pattern or insert, filling the pouch interior with the desired product, top sealing each pouch, and picking off (or removing) the pouch from the assembly process.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF PREFERRED EMBODIMENTS

Figure 1:
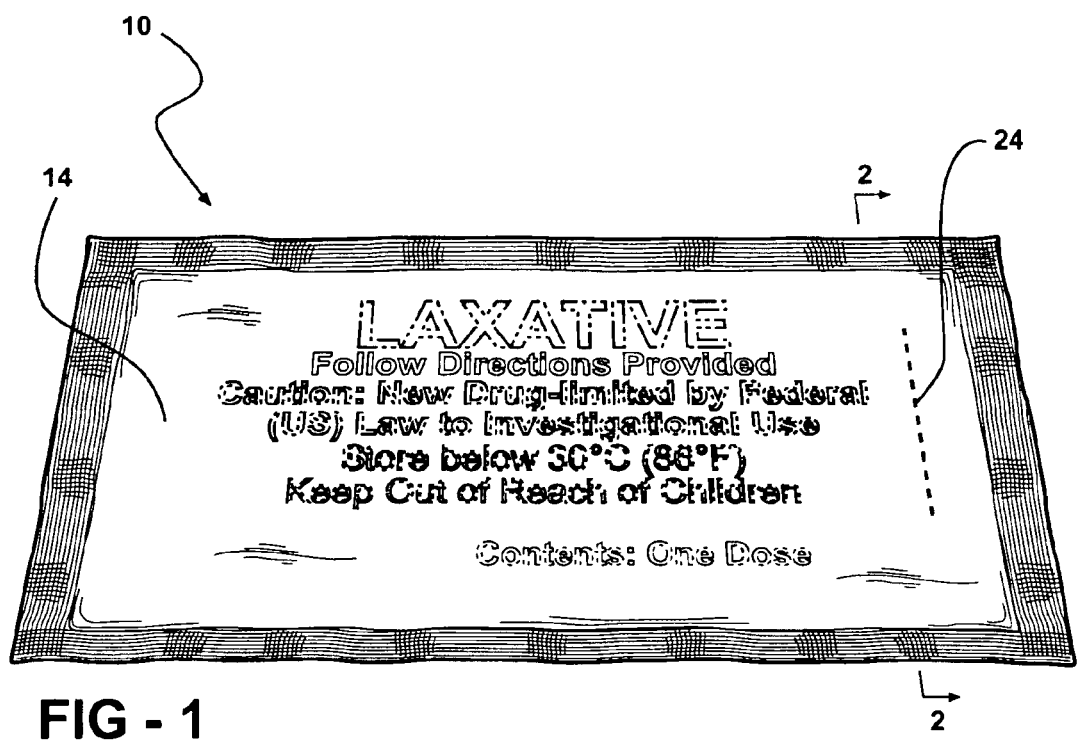
FIG. 1 is an illustration of a tear-resistant pharmaceutical pouch according to the present invention.

Referring now to FIG. 1, a tear-resistant pharmaceutical pouch is illustrated at 10 according to a first preferred embodiment of the present invention. As described previously, the present invention incorporates the use of a high-density polyethylene, in a pharmaceutical packaging application, combined with the clay coating of the oriented high-density polyethylene and which provides heat resistance along with both the appearance and printability of paper.

Figure 2:
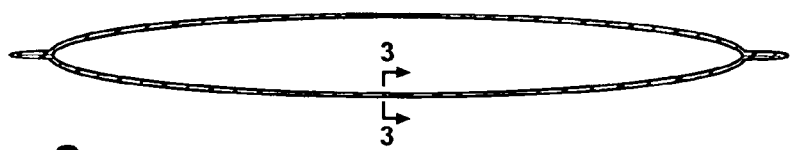
FIG. 2 is a cutaway view taken along line 2—2 of the pouch illustrated in FIG. 1.
Figure 3:
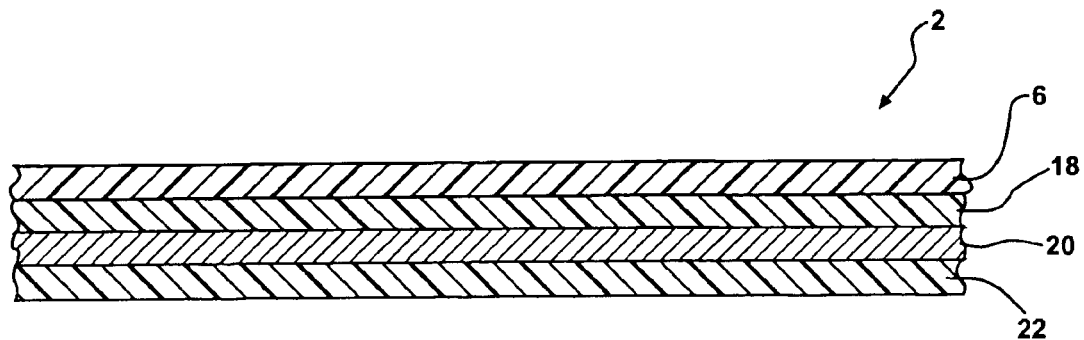
FIG. 3 is a further cutaway view, taken along line 3—3 in FIG. 2, and enlarged in size to illustrate the multi-layered arrangement of each side associated with the pharmaceutical pouch.
Figure 4:
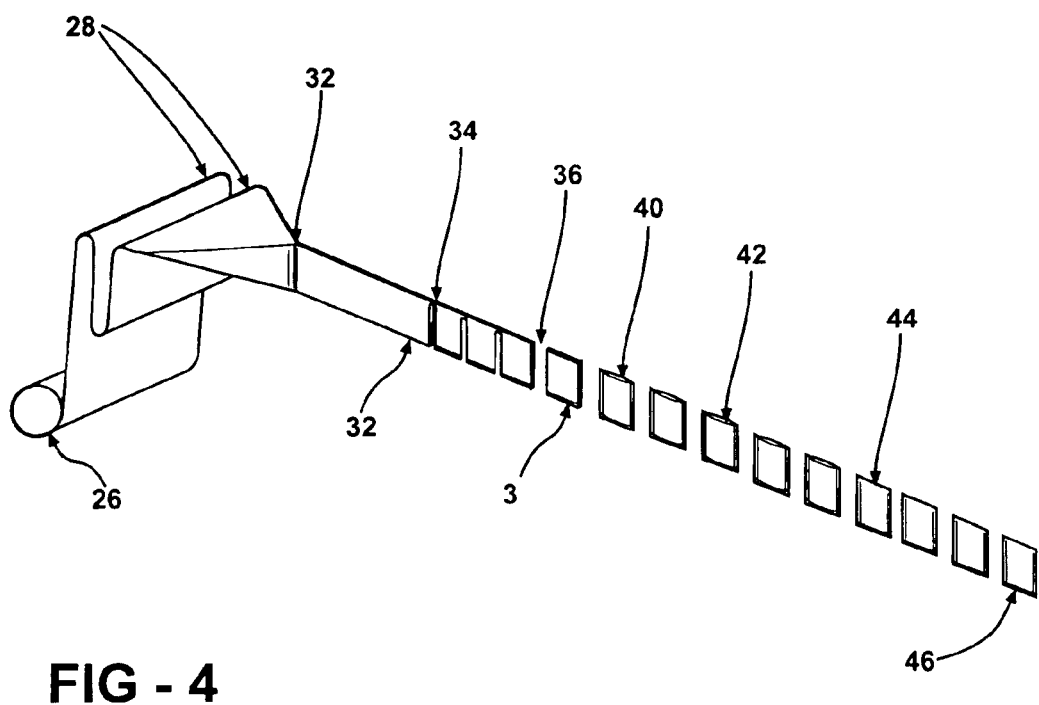
FIG. 4 is an illustration of a pouch manufacturing process for mass producing the pouches according to the present invention.

Referring again to FIG. 1, as well as to the succeeding cutaway views of FIGS. 2 and 3, the no-tear pharmaceutical pouch structure 10 includes a first multi-layered side 12 and a second multi-layered side 14. Each side is typically constructed of a rectangular sheet of material and, as will be subsequently described in reference to the manufacturing process illustrated in FIG. 4, is joined along its four interconnecting and extending edges so that the pouch 10 defines a hermetically sealed interior. It is also understood that the pouch can adopt any overall configuration and shape within the scope of the invention.

In a preferred embodiment, and referring in particular to the cutaway and enlarged view of FIG. 3, a first outermost layer 16 is illustrated of selected side 12 and includes a clay material coated high density polyethylene film. The first layer 16 of film is typically provided, without limitation, in the 200–300 gauge thickness range, however other thickness ranges are also contemplated within the scope of the invention.

A second layer 18 of a polymer material, including without limitation a polyethylene or polyethylene/acid copolymer extrusion laminating resin, is provided and is secured to an inwardly facing surface of each of the first layers 16 of material. The second layer 18 of polymer material is further provided with a density lesser than that of the first layer 16. Additional layers include an aluminum foil layer 20 secured to an exposed facing surface of the laminating resin layer 18 and a final innermost layer 22 of a polyethylene/acid copolymer or ionomer extrusion sealant resin is applied in turn to an exposed inwardly facing surface of the foil layer 20. The gauge thicknesses of each of the layers are further contemplated to be in the range of +/−20%.

As described previously, and without the heat resistance imparted by the clay coating, the oriented high-density polyethylene layer 16 would melt under normal sealing conditions, causing the molecular orientation to relax, and thereby further negating the tear resistance of the film. The pouch structures are further heat sealed to enclose one or more dosages of pharmaceutical items (not shown but evident from the package illustration of FIG. 1) these including, without limitation, solid oral dosages, effervescent tablets, or transdermal patches. As is further again shown in FIG. 1, the pouch 10 is only opened through the subsequent cutting (scissoring) of the enclosed package, and such as along directional lines indicated thereupon at 24. In this fashion, the mode of failure through children biting and tearing into the pouches is eliminated.

Referring now to FIG. 4, a manufacturing schematic for producing a plurality of the tear-resistant pouches 10 is illustrated and includes the multi-layered material, as previously best illustrated in the cutaway view of FIG. 3, first being provided upon a web roll 26. After being unreeled, the material is tensioned, such as at locations 28 and by pinch rollers and the like.

The unreeled roll material is then folded in half in a cross sectional direction, via its travel through a plow assembly 30. Subsequent steps include heat-sealing a bottom edge of the folded material, see at 32, in addition to likewise heat sealing extending side portions 34, this occurring according to specified width dimensions and at spaced apart increments.

Yet additional steps include a succeeding blade cutoff, at 36, for carefully sectioning, from the roll, individual pouches along a substantial mid-point of each sealed side 34, and particularly in a manner by which each individual pouch retains its hermetically sealed nature. Further succeeding steps include forming an open top edge of each sectioned pouch, at 40, utilizing an appropriate pattern or insert (not shown), filling the pouch interior with the desired product, at 42, top sealing each pouch (again such as by heat sealing and as is shown at 44), and picking off (or removing) the pouch from the assembly process, finally at 46.

Having described the presently preferred embodiments, it is to be understood that the invention may be otherwise embodied within the scope of the appended claims.

What is claimed is:

1. A multi-layered pouch for pharmaceutical use, comprising:
    first and second sides engaged along a plurality of extending edges thereof to define a hermetically sealed interior, each of said sides further comprising:
    an outermost oriented, high density polyethylene polymer film coated with a clay material;
    a lower density polymer film secured to an inwardly facing side of said high density polymer film;
    a metal foil layer secured to an exposed inwardly facing side of said lower density film; and
    a sealant resin layer secured to an exposed inwardly facing side of said foil layer;
    said pouch exhibiting tear resistant properties.

2. The pharmaceutical pouch as described in claim 1, said clay coated high density polyethylene polymer film further comprising a gauge thickness established in a range of 200 to 300.

3. The pharmaceutical pouch as described in claim 1, said lower density polymer film further comprising a low density polyethylene laminating resin.

4. The pharmaceutical pouch as described in claim 1, said lower density polymer film further comprising a polyethylene/acid copolymer extrusion laminating resin.

5. The pharmaceutical pouch as described in claim 1, said foil layer further comprising a 35 gauge aluminum foil.

6. The pharmaceutical pouch as described in claim 1, said sealant resin further comprising a polyethylene/acid copolymer resin.

7. The pharmaceutical pouch as described in claim 1, said sealant resin further comprising an Ionomer extrusion resin.

8. The pharmaceutical pouch as described in claim 1, said first and second sides each exhibiting a substantially rectangular shape having first, second, third and fourth sides.

9. The pharmaceutical pouch as described in claim 8, further comprising heat sealing a bottom edge and first and second side extending edges of said sealing pouch.

10. The pharmaceutical pouch as described in claim 9, further comprising an open top edge of said pouch being sealed following filling with the pharmaceutical related items.

11. A multi-layered pouch capable of holding at least one item, comprising:
    first and second sheets of material engaged along a plurality of extending edges thereof to define a hermetically sealed interior for holding the items, each of said sheets further comprising:
    a first oriented, high density polyethylene polymer film coated with a clay material;
    a second polymer film secured to a facing side of said first polymer film;

a foil secured to an exposed facing side of said second film; and a sealant secured to an exposed facing side of said foil;

said pouch exhibiting tear resistant properties.

12. The pouch as described in claim 11, said second polymer film further comprising at least one of a polyethylene laminating resin and a polyethylene/acid copolymer extrusion laminating resin.

13. The pouch as described in claim 12, said second polymer film exhibiting a density lower than said first polymer film.

14. The pouch as described in claim 11, said foil further comprising an aluminum foil.

15. The pouch as described in claim 11, said sealant further comprising at least one of a polyethylene/acid copolymer sealant resin and an Ionomer extrusion sealant resin.

16. A multi-layered pouch for pharmaceutical use, comprising:

first and second sides, each exhibiting a rectangular shape having first, second, third and fourth sides and which are heat sealingly engaged along extending and interconnected edges thereof to define a hennetically sealed interior, each of said sides further comprising:

a first outer oriented, high density polyethylene film exhibiting a first density and which is coated with a clay material;

a second polymer film including at least one of a polyethylene laminating resin and a polyethylene/acid copolymer extrusion laminating resin, said second film being secured to an inner facing side of said high density polymer film and exhibiting a second density less than that of said first polymer film;

an aluminum foil layer secured to an exposed inner facing side of said second polymer film; and a sealant resin layer secured to an exposed inner facing side of said foil layer;

said pouch exhibiting tear resistant properties.

\* \* \* \* \*